United States Patent
Alsup et al.

(10) Patent No.: US 7,142,545 B1
(45) Date of Patent: Nov. 28, 2006

(54) METHOD AND APPARATUS FOR HIERARCHICAL CIRCUITS WITH SWITCHING DECISIONS

(75) Inventors: Billie R. Alsup, Livermore, CA (US); Diamantis Kourkouzelis, Fremont, CA (US)

(73) Assignee: Redback Networks Inc., San Jose, CA (US)

( * ) Notice: Subject to any disclaimer, the term of this patent is extended or adjusted under 35 U.S.C. 154(b) by 1061 days.

(21) Appl. No.: 10/159,384

(22) Filed: May 31, 2002

Related U.S. Application Data (60) Provisional application No. 60/368,780, filed on Mar. 27, 2002.

(51) Int. Cl.
*H04L 12/28* (2006.01)

(52) U.S. Cl. .................. 370/395.3; 370/419; 370/466; 370/469

(58) Field of Classification Search .............. 370/392, 370/395.3, 395.31, 395.51, 395.52, 395.6, 370/395.63, 419, 469, 466, 467
See application file for complete search history.

(56) References Cited

U.S. PATENT DOCUMENTS

| | | | |
|---|---|---|---|
| 5,870,384 A | * | 2/1999 | Salovuori et al. ........... 370/235 |
| 6,188,693 B1 | | 2/2001 | Murakami |
| 6,272,109 B1 | * | 8/2001 | Pei et al. .................... 370/230 |
| 7,023,856 B1 | * | 4/2006 | Washabaugh et al. ... 370/395.1 |
| 2002/0057699 A1 | * | 5/2002 | Roberts ................. 370/395.32 |

OTHER PUBLICATIONS

Brown, C., et al., "Multiprotocol Interconnect Over Frame Relay," Network Working Group, RFC 2427, Sep. 1998.
Fox, B., et al., "Virtual Private Networks Identifier," Network Working Group, RFC 2685, Sep. 1999.
Grossman, D., et al., "Multiprotocol Encapsulation Over ATM Adaptation Layer 5," Network Working Group RFC 2684, Sep. 1999.

* cited by examiner

*Primary Examiner*—Chau Nguyen
*Assistant Examiner*—Kerri M. Rose
(74) *Attorney, Agent, or Firm*—Blakely, Sokoloff, Taylor & Zafman LLP (57) ABSTRACT

A method and apparatus for hierarchical circuits with different switching decisions is described. In one embodiment, a computer implemented method provides for receiving a first and second packet on a virtual connection that traverses said network element, the first packet and the second packet being of a first traffic type that corresponds to the virtual connection, the first packet's payload being a third packet of a second traffic type and the second packet's payload being a fourth packet of a third traffic type, processing the first and the second packet with a first traffic type function, separating the third packet and the fourth packet into different traffic flows based on their traffic types, applying a first set of one or more features to the third packet, and applying a second set of one or more features to the fourth packet.

31 Claims, 10 Drawing Sheets

VIRTUAL CIRCUIT STRUCTURE
301

| VIRTUAL CIRCUIT HANDLE 303 | TIMERS 329 |
|---|---|
| POINTER TO INTERFACE 305 | IP FORWARDING FEATURE BLOCK POINTER 331A |
| LIST POINTERS TO AGGREGATE POINTERS ON AN INTERFACE 307 | ... |
| POINTER TO PORT 309 | BYPASS FEATURE BLOCK POINTER 331F |
| FLOW COUNTERS (BYTE AND/OR PACKET) 311 | CIRCUIT HIERARCHY DEMUX FEATURE BLOCK POINTER 331G |
| POINTER TO ROOT MODULAR FUNCTIONAL BLOCK 313 | |
| POINTER TO FIB 315 | |
| POINTER TO ACL 317 | |
| POINTER TO AN LFIB 319 | |
| ERROR COUNTERS (UNREACHABLE, VIRTUAL CIRCUIT DOWN, UNKNOWN ENCAPSULATION) 321 | |
| REFERENCE COUNTER 323 | |
| ENCAPSULATION TYPE 325 | |
| TRANSMIT COUNTER 327 | |

FEATURE BLOCK ARRAY
331

FIG. 3

BYPASS FEATURE BLOCK
401

| EGRESS VIRTUAL CIRCUIT HANDLE 403 |
| --- |
| ADJACENCY ID 405 |
| SLOT NUMBER 407 |
| PACKET MESH CHANNEL 409 |

CIRCUIT HIERARCHY DEMUX FEATURE BLOCK
411

| TRAFFIC FILTER 413A | POINTER TO VIRTUAL INTERNAL CHILD CIRCUIT 415A |
| --- | --- |
| TRAFFIC FILTER 413B | POINTER TO VIRTUAL INTERNAL CHILD CIRCUIT 415B |
| TRAFFIC FILTER 413C | POINTER TO VIRTUAL INTERNAL CHILD CIRCUIT 415C |

"""
METHOD AND APPARATUS FOR HIERARCHICAL CIRCUITS WITH SWITCHING DECISIONS

CROSS-REFERENCE TO RELATED APPLICATIONS

This application claims the benefit of U.S. Provisional patent application No. 60/368,780 entitled "Method and Apparatus for Hierarchical Circuits with Switching Decisions" filed on Mar. 27, 2002.

BACKGROUND OF THE INVENTION

1. Field of the Invention

This invention relates to the field of communication. More specifically, the invention relates to communication networks.

2. Background of the Invention

Although ATM is able to carry different types of traffic, certain features that are applied to the ATM permanent virtual circuit (PVC) that is carrying the traffic cannot be applied to the different types of traffic. An organization may wish to apply features, such as ACLs, counters, rate limiting, etc., to different types of traffic from the perspective that the different types of traffic are different traffic flows. In addition, an organization may wish to transparently switch one type of traffic while routing another type of traffic. This would allow the organization to provide value added services for the routed traffic. Unfortunately, the different traffic flows are represented as a single PVC.

Routers typically internally represent each connection (whether it be an IP route, a label switched path, etc.) as an interface or set of interfaces, which is a network layer entity. Since an interface is a network layer entity, it includes various pieces of information needed for the network layer.

Figure 1:
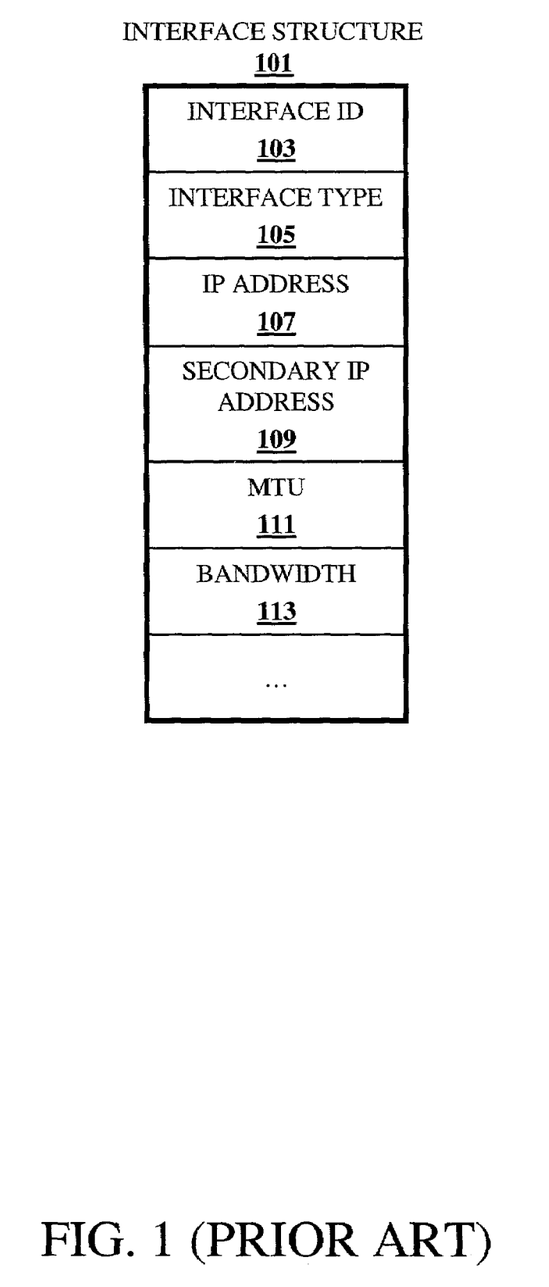
FIG. 1 (Prior Art) is a diagram illustrating an exemplary data structure for an interface.

FIG. 1 (Prior Art) is a diagram illustrating an exemplary data structure for an interface. An interface structure 101 includes multiple fields describing the interface. An interface ID field 103 indicates a value identifying the interface. An interface type field 105 describes the type of interface (e.g., Ethernet, ATM, PoS, etc.). An IP address field 107 identifies a 32-bit IP address corresponding to the interface. A secondary IP address field 109 indicates a second 32-bit IP address for the interface. A maximum transmission unit (MTU) field 111 indicates the maximum allowable packet size to be transmitted with the interface. A bandwidth field 113 indicates the amount of bandwidth allocated to the interface. The interface structure 101 is a relatively expensive structure.

The relatively expensive interface structure consumes memory of a network element and consumes bus resources when the network element transfers interface structures to its line cards. In addition, the interface structure is a layer 3 entity that is not utilized by lower layers.

BRIEF SUMMARY OF THE INVENTION

A method and apparatus for hierarchical circuits with different switching decisions is described. According to one aspect of the invention, a computer implemented method provides for receiving a first and second packet on a virtual connection that traverses said network element, the first packet and the second packet being of a first traffic type that corresponds to the virtual connection, the first packet's payload being a third packet of a second traffic type and the second packet's payload being a fourth packet of a third traffic type, processing the first and the second packet with a first traffic type function, separating the third packet and the fourth packet into different traffic flows based on their traffic types, applying a first set of one or more features to the third packet, and applying a second set of one or more features to the fourth packet.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

A method and apparatus for hierarchical circuits with different switching decisions is described. According to one embodiment of the invention, different types of traffic are demultiplexed from a single virtual external parent circuit into virtual internal child circuits. A virtual external parent circuit and virtual internal child circuits are different types of virtual circuits. Virtual circuits are represented with data structures that have information for layer 2 switching, hence virtual circuits are below interfaces which have information for layer 3 routing. A virtual external parent circuit is a virtual circuit used for externally transmitting from a network element (e.g., an ATM PVC). A virtual internal child circuit is a virtual circuit used for internally switching traffic through a network element.

Features such as counters, rate limiting, etc., can be applied to virtual circuits. Features that are individually associated with each of the virtual internal child circuits are applied to the virtual internal child circuits. In another embodiment of the invention, features are also applied to the virtual external parent circuit. According to another embodiment of the invention, certain types of traffic are processed by a bypass modular functional block to be switched out to a network element that has been previously specified.

Figure 2:
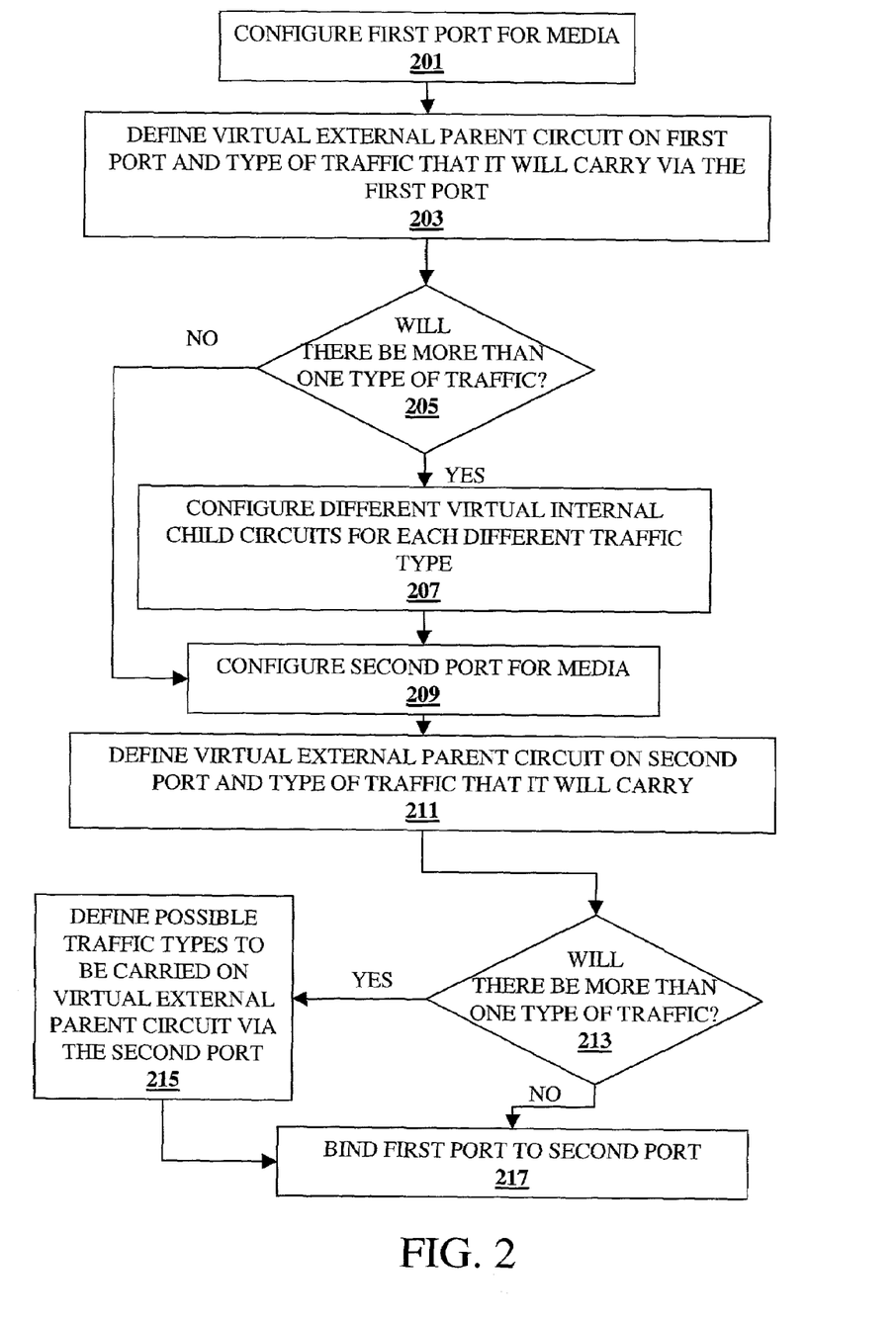
FIG. 2 is a flow chart for configuring a network element to process different traffic carried on a single virtual external parent circuit according to one embodiment of the invention.

FIG. 2 is a flow chart for configuring a network element to process different traffic carried on a single virtual external parent circuit according to one embodiment of the invention. At block 201, a first port is configured for a certain media (e.g., ATM). Typically, the first port to be configured is an ingress port. At block 203, a virtual external parent circuit is defined on the first port and the traffic that is will carry via the first port is defined. If the virtual external parent circuit is an ATM PVC, then defining it would include defining the virtual path identifier (VPI) and the virtual channel identifier (VCI) for the PVC. If the PVC is to carry a single type of traffic, such as Bridge 1483 traffic, then the administrator would configure it to carry Bridge 1483 traffic. If the PVC is to carry mixed traffic, then the administrator would indicate that the PVC will carry mixed traffic within the ATM cells (e.g., multitraffic or some other keyword to configure the network element to expect mixed traffic types to be received over the PVC).

At block 205, it is determined if more than one type of traffic will be carried on the defined virtual external parent circuit. If there will be more than one type of traffic, control flows to block 207. If there will not be more than one type of traffic, control flows to block 209.

At block 207, different virtual internal child circuits are configured for the different possible types of traffic to be carried on the defined virtual external parent circuit. For example, a first virtual internal child circuit is defined for IP-type traffic while a second virtual internal child circuit is defined for PPP-type traffic, both of which are to be carried on the defined PVC. IP-type traffic may include ARP traffic and IPoE traffic sub-types while PPP-type traffic may include PPPoE discovery traffic and PPPoE traffic sub-types. Traffic types may be defined in a variety of ways. In addition, alternative embodiments of the invention may not configure a virtual internal child circuit for types of traffic, but may instead configure a virtual internal child circuit for a specific traffic sub-type.

At block 209, a second port is configured for a given media. At block 211, the virtual external parent circuit is defined on the second port and the types of traffic that it will carry are also defined. At block 213, it is determined if more than one type of traffic has been defined for the virtual external parent circuit defined at the second port. If there will not be more than one type of traffic, then control flows to block 217. If there will be more than one type of traffic, control flows to block 215.

At block 215, the categories of traffic types to be carried on the virtual external parent circuit via the second port is defined. From block 215 control flows to block 217.

At block 217, the first port is bound to the second port.

After configuration, a virtual circuit structure is generated for the configured virtual external parent circuit and for the configured virtual internal child circuits. In addition, demultiplexing ("demux") modular functional blocks, which will be described in more detail later, are allocated and associated with the generated virtual circuit structures. Additional configuration by an administrator defines the features (e.g., ACLs, rate limiting, counters, etc.) to be applied to the configured virtual circuits.

Figure 3:
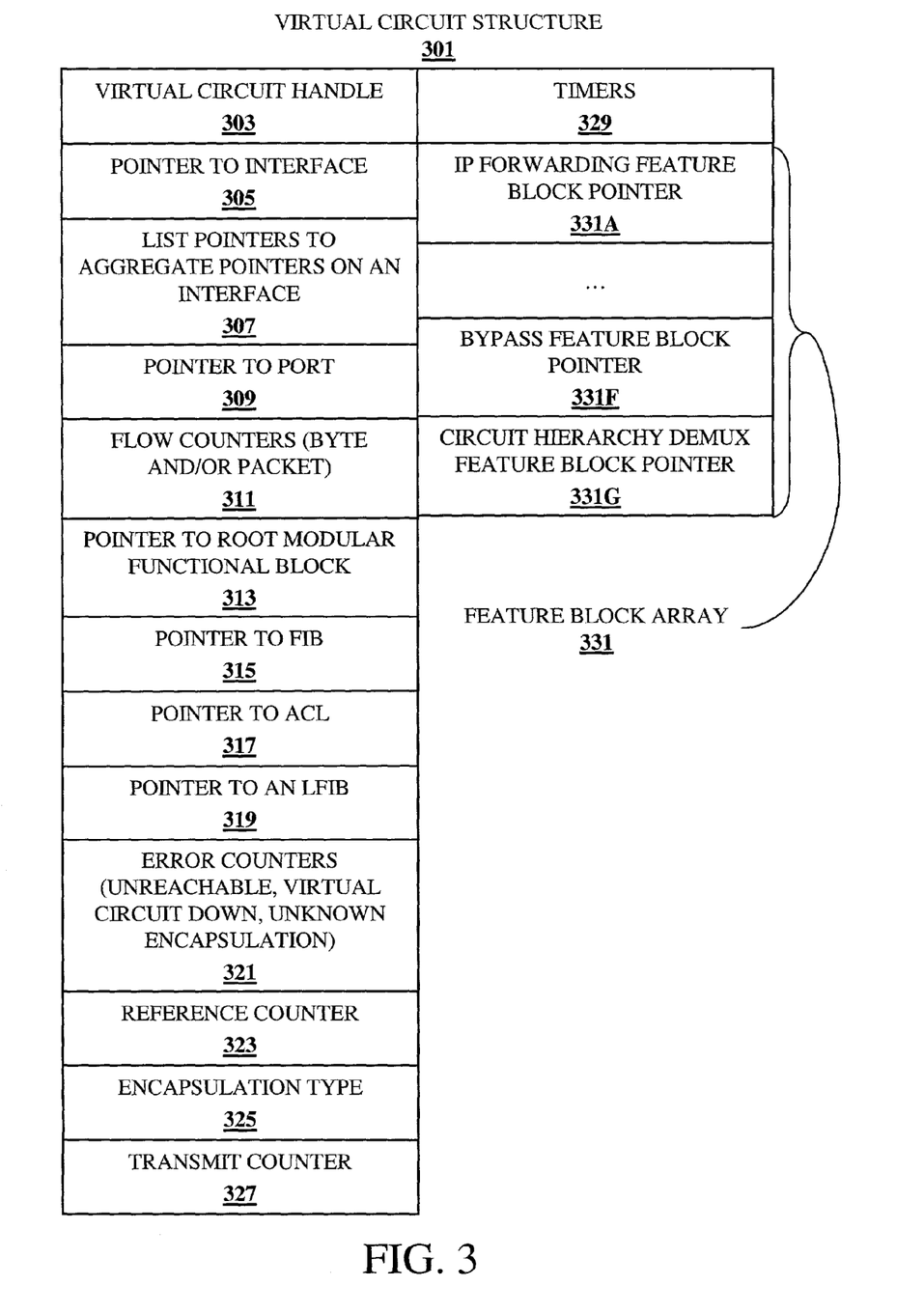
FIG. 3 is an exemplary diagram illustrating a virtual circuit structure according to one embodiment of the invention.

FIG. 3 is an exemplary diagram illustrating a virtual circuit structure according to one embodiment of the invention. FIG. 3 illustrates a virtual circuit structure generated for a virtual circuit. The virtual circuit structure 301 includes numerous fields for processing packets associated with the virtual circuit (either egress or ingress) corresponding to the virtual circuit structure 301. A virtual circuit handle field 303 identifies a virtual circuit. In alternative embodiments of the invention, the virtual circuit handle field 303 indicates a pointer value for the virtual circuit structure 301. A pointer to interface field 305 includes a pointer to an interface structure. The pointer to interface field 305 indicates whether the represented virtual circuit is bound to an interface. If the represented virtual circuit is bound to an interface, then the pointer to interface field 305 provides access to certain interface data, such as interface name and/or context. In addition, the pointer to interface field 305 provides access to features associated with the interface.

A pointer to port field 309 indicates a port through which traffic will be transmitted for an egress virtual circuit. A flow counter field 311 indicates byte counters and packet counters for traffic associated with the represented virtual circuit. A pointer to root modular functional block field 313 points to the first modular functional block of a possible chain of modular functional blocks corresponding to the virtual circuit represented by the virtual circuit structure 301. A pointer to FIB field 315 points to a forwarding information base. A pointer to an ACL field 317 points to an access control list corresponding to the virtual circuit represented by the virtual circuit structure 301. A pointer to an LFIB field 319 points to a label forwarding information base if applicable. An error counter field 321 indicates counters such as unreachable counters, virtual circuit down counters, and unknown encapsulation counters. A reference counter field 323 indicates the number of other applications and/or processes that reference the virtual circuit structure 301. The reference counter field can be used to avoid releasing the virtual circuit structure 301 while it is still being used.

An encapsulation type field 325 identifies the encapsulation type defined for the virtual circuit represented by the virtual circuit structure 301. A transmit counter field 327 indicates a counter for the number of packets transmitted from the represented virtual circuit. A timers field 329 indicates timers defined for the represented virtual circuit. The timers field 329 includes a delete timer and a free timer. The represented virtual circuit may be created from an explicit configuration command or as a side-effect of another operation (e.g., configuring a tunnel).

If the virtual circuit structure 301 is created as a side-effect of an operation, then a configuration command for the virtual circuit is expected. If the configuration command is not received before the delete timer expires, then the virtual circuit structure 301 is deleted.

If a configuration command is received to delete the virtual circuit structure 301, then the virtual circuit structure 301 is marked as deleted, but the memory is not freed until the free timer expires. In alternative embodiments of the invention, there is a separate timer field defined for each timer.

The virtual circuit structure 301 also includes a feature block array 331. Each element of the feature block array 331 points to a feature block associated with the represented virtual circuit. Feature blocks are data structures with information for features defined specifically for the virtual circuit represented by the virtual circuit structure 301. The virtual circuit structure 301 is illustrated as including an IP forwarding feature block pointer 331A, a bypass feature block pointer 331F, an a demux feature block pointer 331G.

Various embodiments of the invention may implement virtual circuit structure 301 differently. For example, the pointer to interface field and the pointer to port field may not be included in a virtual structure in alternative embodiments of the invention.

While in one embodiment of the invention the same circuit structure is allocated for all virtual circuits, alternative embodiments of the invention allocate different virtual circuit structures for different virtual circuits. For example, a circuit structure as illustrated in FIG. 3 may be allocated for virtual external parent circuits while virtual internal child circuits are allocated virtual circuit structures with the following fields: a virtual circuit handle field, various counter fields, an encapsulation type field, and a feature block array.

Figure 4:
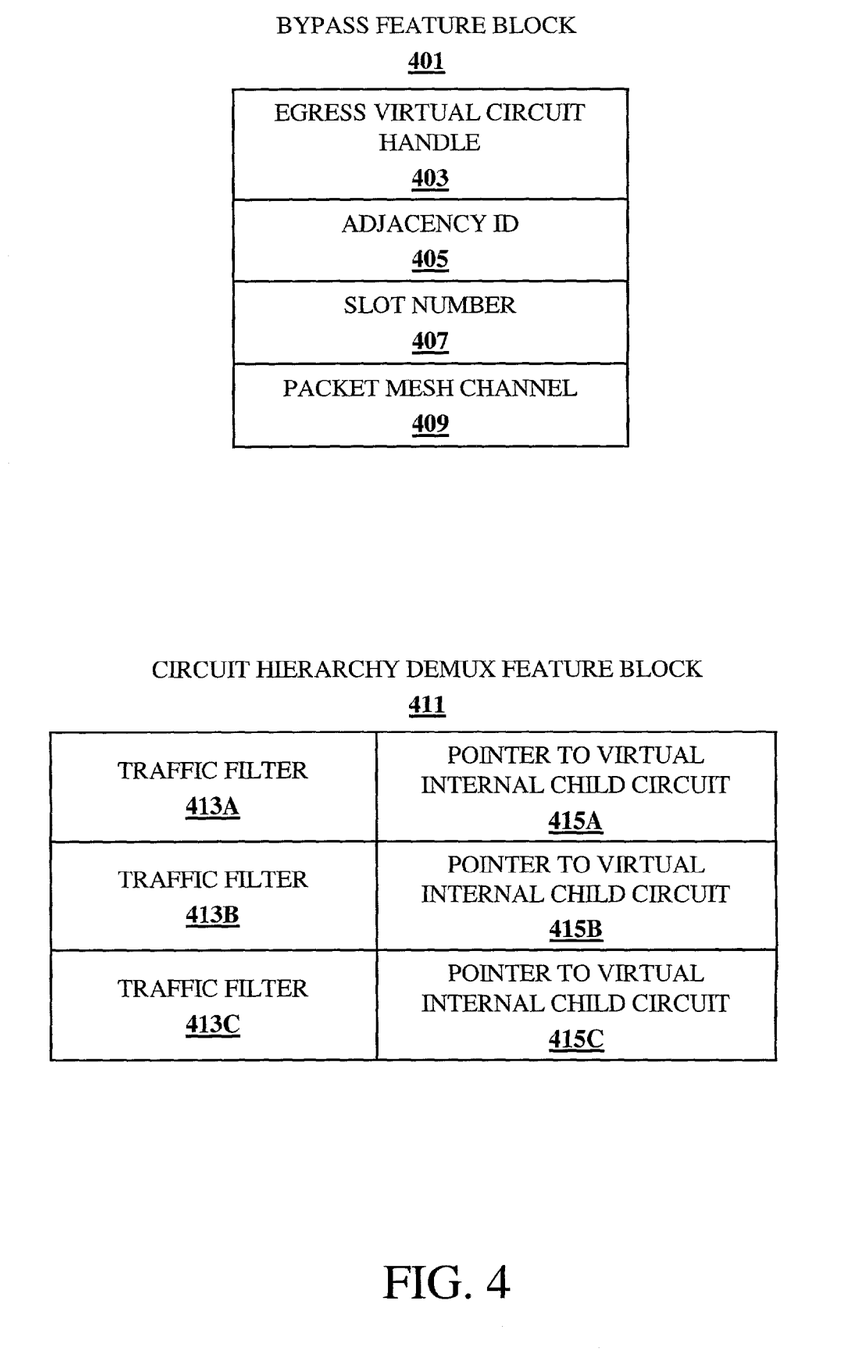
FIG. 4 is an exemplary diagram of feature blocks according to one embodiment of the invention.

FIG. 4 is an exemplary diagram of feature blocks according to one embodiment of the invention. A bypass feature block 401 includes an egress virtual circuit handle field 403, an adjacency ID field 405, a slot number field 407, and a packet mesh channel field 409. In one embodiment of the invention, the egress virtual circuit handle field 403 identifies an egress virtual circuit (e.g., with an ASCII name). In another embodiment of the invention, the egress virtual circuit handle field 403 references a virtual circuit structure. The adjacency ID field 405 and the slot number field 407 indicate destination information for packets to be routed to a bypass. The packet mesh channel field 409 indicates a channel through a mesh to arrive at the appropriate card and port. In alternative embodiments of the invention, the egress virtual circuit field 403 is not included in the bypass feature block 401 because the packets can be forwarded without the egress virtual circuit and features are not desired for traffic that is bypassed. In another embodiment of the invention, the packet mesh channel field 409 is not included in the bypass feature block. Instead, data indicating how to forward the unknown traffic through the host network element is included in the bypass feature block.

FIG. 4 also illustrates an exemplary circuit hierarchy demux feature block 411. The circuit hierarchy demux feature block 411 acts as a mapping structure. The circuit hierarchy demux feature block 411 correlates traffic types to pointers to virtual internal child circuits. In FIG. 4, the circuit hierarchy demux feature block 411 is illustrated as having traffic filter fields 413A–413C respectively mapped to pointer to virtual internal child circuit fields 415A–415C. Use of the information indicated in the bypass feature block 401 and the circuit hierarchy demux feature block 411 will be described in more detail later.

Figure 5:
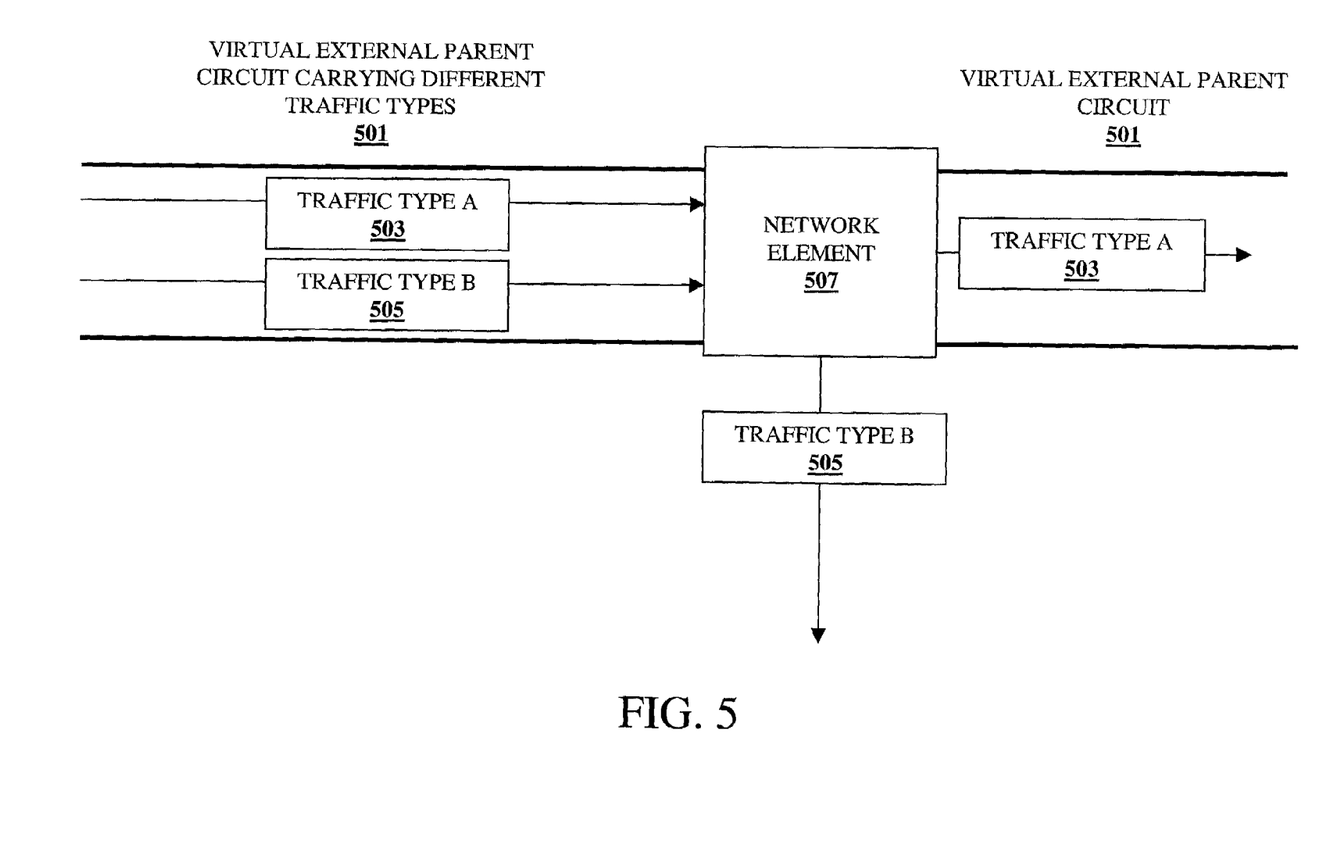
FIG. 5 is an exemplary diagram illustrating a virtual external parent circuit carrying mixed traffic according to one embodiment of the invention.

FIG. 5 is an exemplary diagram illustrating a virtual external parent circuit carrying mixed traffic according to one embodiment of the invention. In FIG. 5, a virtual external parent circuit 501 is carrying a traffic type A 503 and the traffic type B 505. The virtual external parent circuit 501 is carrying the traffic type A 503 and the traffic type B 505 to a network element 507. The network element 507 demultiplexes the traffic type A 503 and the traffic type B 505 from the virtual external parent circuit 501. In FIG. 5, the traffic type A 503 continues on the virtual external parent circuit 501 while the traffic type B 505 is transmitted via a different path from the network element 507. Although FIG. 5 illustrates traffic type A 503 and traffic type B 505 being transmitted from the network element 507 via different paths, the traffic type A 503 and traffic type B 505 may exit the network element 507 over the same path. For example, the traffic type B 505 may be routed out the same path that the traffic type A 503 is switched out from the network element 507.

A different traffic type may be inserted and extracted from a virtual external parent circuit that carries traffic to and from a subscriber. The added traffic enables an organization to provide value added services to the subscriber in addition to the services provided to the subscriber by the subscriber's Internet Service Provider. In addition, certain organizations wish to collect statistics on certain traffic. Demultiplexing different traffic types and associating the different traffic types to virtual internal child circuits enables statistics to be maintained for the different types of traffic. Furthermore, features, such as rate limiting can be enforced on virtual internal child circuits. An owner of a network element may want to rate limit IP traffic while not rate limiting VPN traffic that is transmitted and received by a corporated subscriber.

Figure 6:
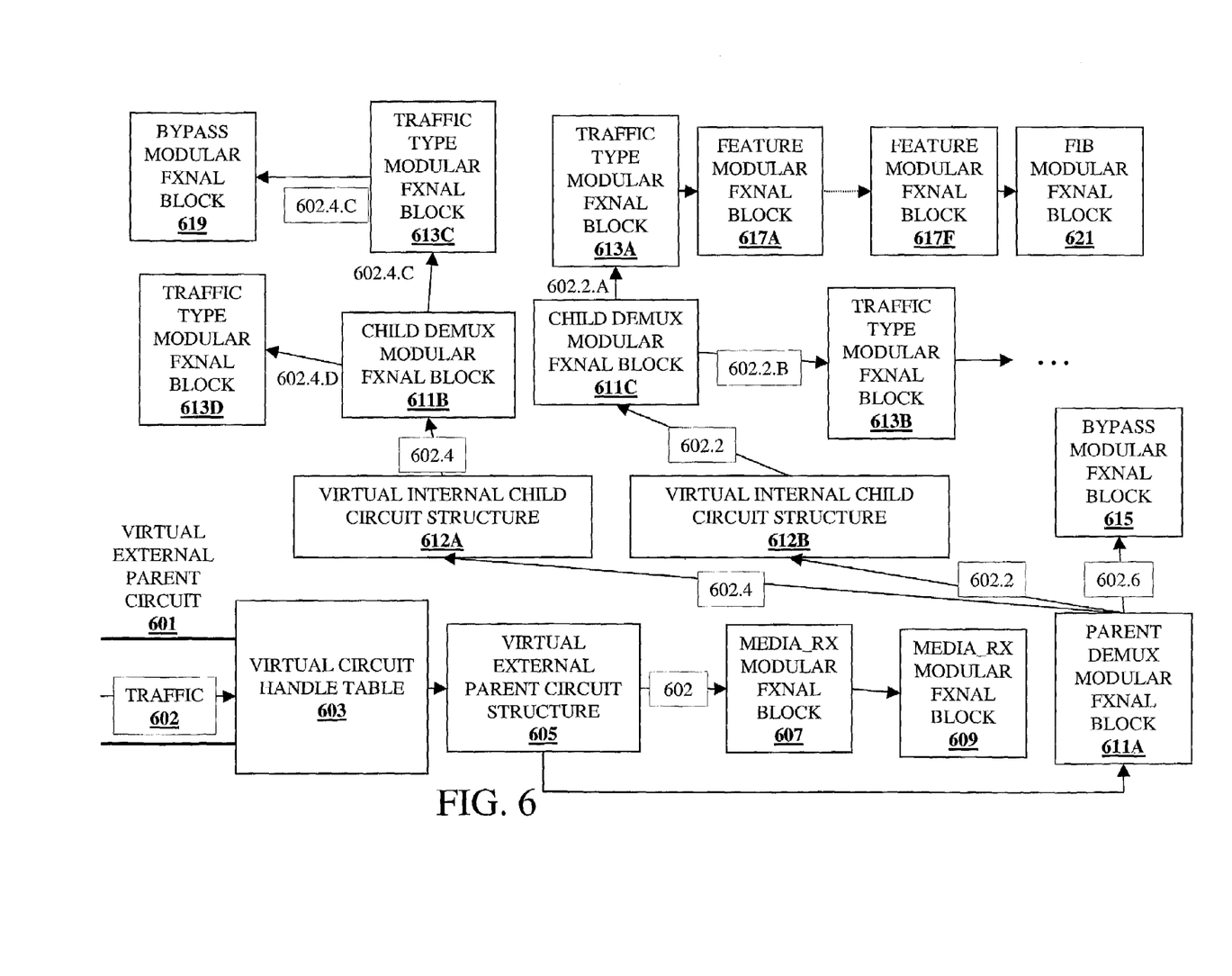
FIG. 6 is an exemplary diagram illustrating internal processing of different traffic types received on a single virtual external parent circuit within a network element according to one embodiment of the invention.

FIG. 6 is an exemplary diagram illustrating internal processing of different traffic types received on a single virtual external parent circuit within a network element according to one embodiment of the invention. In FIG. 6, mixed traffic 602 is received over a virtual external parent circuit 601. A virtual circuit handle that corresponds to the virtual external parent circuit 601 is looked up in a virtual circuit handle table 603. A virtual circuit structure 605 indicated by the virtual circuit handle looked up in the virtual circuit handle table 603 is used to process the mixed traffic 602. The pointer to root modular functional block field within the virtual circuit structure 605 points to a MEDIA_RX modular functional block 607. The referenced root modular functional block is a MEDIA_RX modular functional block 607. A modular functional block is a function that performs a certain task. Each packet (i.e., ATM cell, Frame Relay frame, IP packet, etc.) of the traffic 602 and a value indicating the type of traffic is passed to the MEDIA_RX modular functional block 607. For example, a pointer or address of a memory location where a packet is located is passed to the MEDIA_RX modular functional block 607 along with a value indicating the traffic type as ATM. The MEDIA_RX modular functional block 607 processes each packet passed to it. Each processed packet of the traffic 602 is then passed to a MEDIA_RX modular functional block 609 that processes each previously processed unit of the traffic 602. To provide an example, if the traffic 602 is ATM cells carrying Ethernet frames, then the MEDIA_RX modular functional block 607 examines the ATM headers of each ATM cell and locates the beginning of each payload within the ATM cells to the MEDIA_RX modular functional block 609. Since the virtual external parent circuit has already been configured as carrying Ethernet frames, then the MEDIA_RX modular functional block 609 processes Ethernet frames. The MEDIA_RX modular functional block 609 will inspect the Ethernet headers and the unit with an indication of the beginning of the Ethernet header and pass the type of traffic within the Ethernet frame payload. The traffic 602 and information indicated by the MEDIA_RX modular functional block 609 are passed to a parent demux modular functional block 611A because it has already been defined by an administrator that the virtual external parent circuit will carry multiple categories of traffic types. A value indicating traffic type is passed along with the address or pointer corresponding to a packet to each modular functional block.

The parent demux modular functional block 611A maps each category of traffic in the traffic 602 to the appropriate virtual internal child circuit. The parent demux modular functional block 611A will then pass each unit of the traffic 602 to either a virtual internal child circuit structure 612A or a virtual internal child circuit structure 612B. Alternatively, unknown types of traffic are passed to a bypass modular functional block 615. Each unit of the traffic 602 that is passed to the virtual internal child circuit 612A, the virtual internal child circuit 612B, and the bypass modular functional block 615 are respectively indicated as traffic 602.4, traffic 602.2, and traffic 602.6. To provide an example, the traffic 602.4 is PPPoE-related traffic, the traffic 602.2 is IPoE-related traffic, and the traffic 602.6 is unknown traffic. The processing performed by a bypass modular functional block will be described later in detail.

The virtual internal child circuits 612A and 612B respectively pass the traffic 602.4 and 602.2 respectively to child demux modular functional blocks 611B and 611C. The child demux modular functional blocks 611B and 611C respectively inspect the headers of each packet 602.4 and 602.2 to determine traffic type (e.g., IPoE vs. ARP, PPPoE vs. PPPoE discovery, etc.).

The child demux modular functional block 611B passes each unit of type C within the traffic 602.4, indicated as traffic 602.4.C, to a traffic type modular functional block 613C and each unit of a second type within the traffic 602.4, indicated as traffic 602.4.D to a traffic type modular functional block 613D. The child demux modular functional block 611C passes each unit of type A within the traffic 602.2, indicated as traffic 602.2.A, to a traffic type modular functional block 613A and each unit of a second type within the traffic 602.2, indicated as traffic 602.2.B to a traffic type modular functional block 613B. The traffic type modular functional blocks 613A–613D respectively process traffic of type A–D. To provide an example, the traffic modular functional blocks 613A–613D respectively process IPoE, ARP, PPPoE, and PPPoE discovery traffic.

The traffic 602.2.A flows along the modular functional block chain associated with the traffic type modular functional block 613A. The traffic 602.2.A passes through feature modular functional blocks 617A–617F, which have previously been configured for the virtual internal child circuit represented by the virtual internal child circuit structure 612B. The traffic 602.2.A is then processed by the FIB modular functional block 621, which determines from a FIB how to forward each unit of the traffic 602.2.A.

The traffic 602.2.B flows along the modular functional block chain associated with the traffic type modular functional block 613B, which is not illustrated in FIG. 6.

The traffic 602.4.C is passed from the traffic type modular functional block 613C to a bypass modular functional block 619 to be transparently switched through the network element.

The traffic 602.4.D flows along the modular functional block chain associated with the traffic type modular functional block 613D, which is not illustrated in FIG. 6.

In alternative embodiments of the invention, a child demux modular functional block is not the root modular functional block from a virtual internal child circuit structure. Instead, the root modular functional block points to a traffic type modular functional block because each virtual internal child circuit is configured for a specific traffic type instead of a traffic category.

Figure 7:
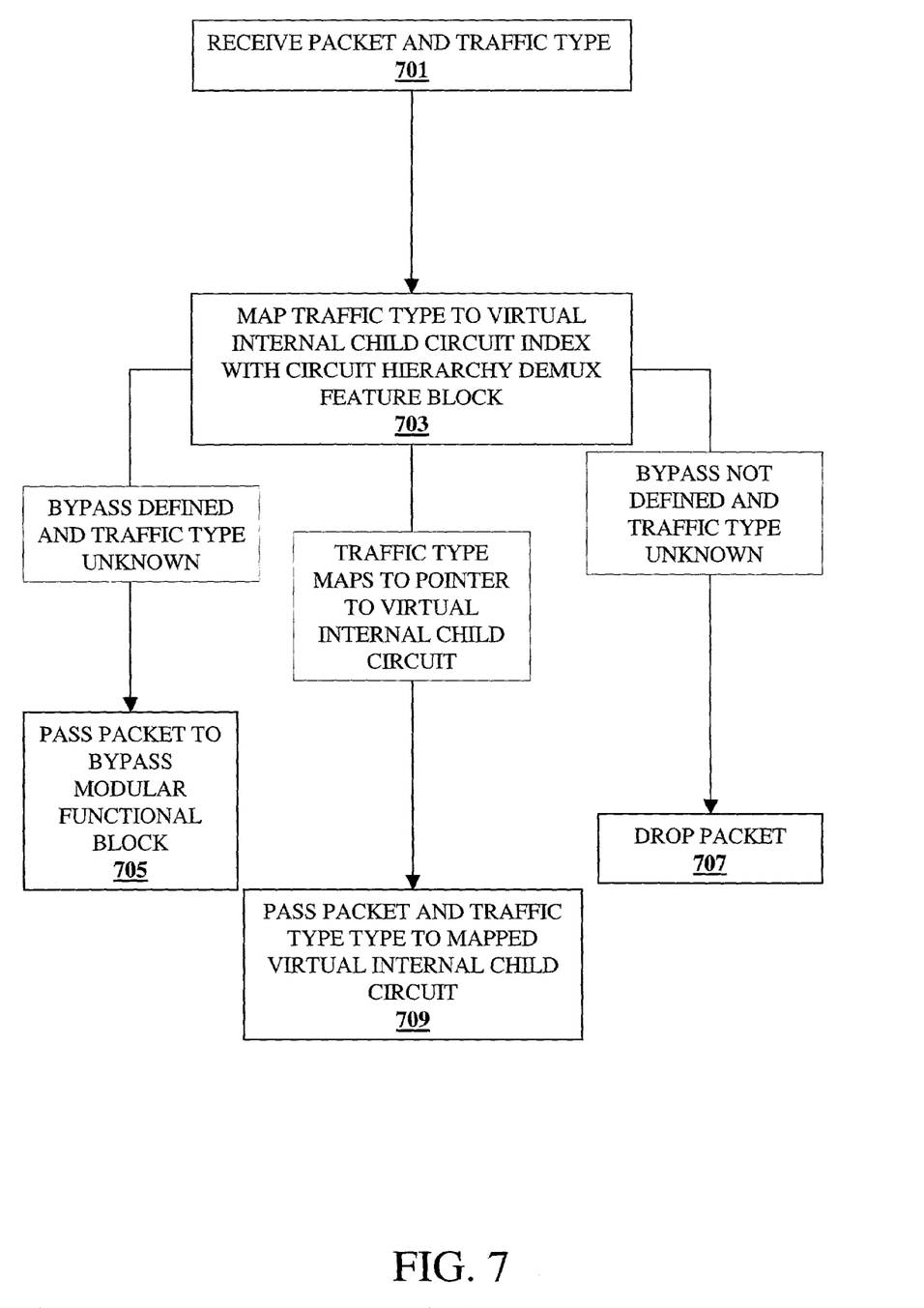
FIG. 7 is a flow chart for processing mixed traffic according to one embodiment of the invention.

FIG. 7 is a flow chart for processing mixed traffic according to one embodiment of the invention. At block 701, a packet and traffic type are received. In alterative embodiments of the invention, only a packet is received and the traffic type is determined by inspecting the packet. At block 703, the traffic type is mapped to a virtual internal child circuit index with the circuit hierarchy demux feature block. If a bypass has been defined and the traffic category is unknown, then control flows to block 705. If a bypass has not been defined and the traffic category is unknown, then control flows to block 707. If the traffic type maps to a virtual internal child circuit, then control flows to block 709.

At block 705, the unknown traffic is forwarded out with a bypass modular functional block using information in the bypass feature block referenced by the bypass feature block pointer of the corresponding virtual circuit structure.

At block 707, the packet is dropped.

At block 709, the traffic is passed to the mapped virtual internal child circuit.

Figure 8:
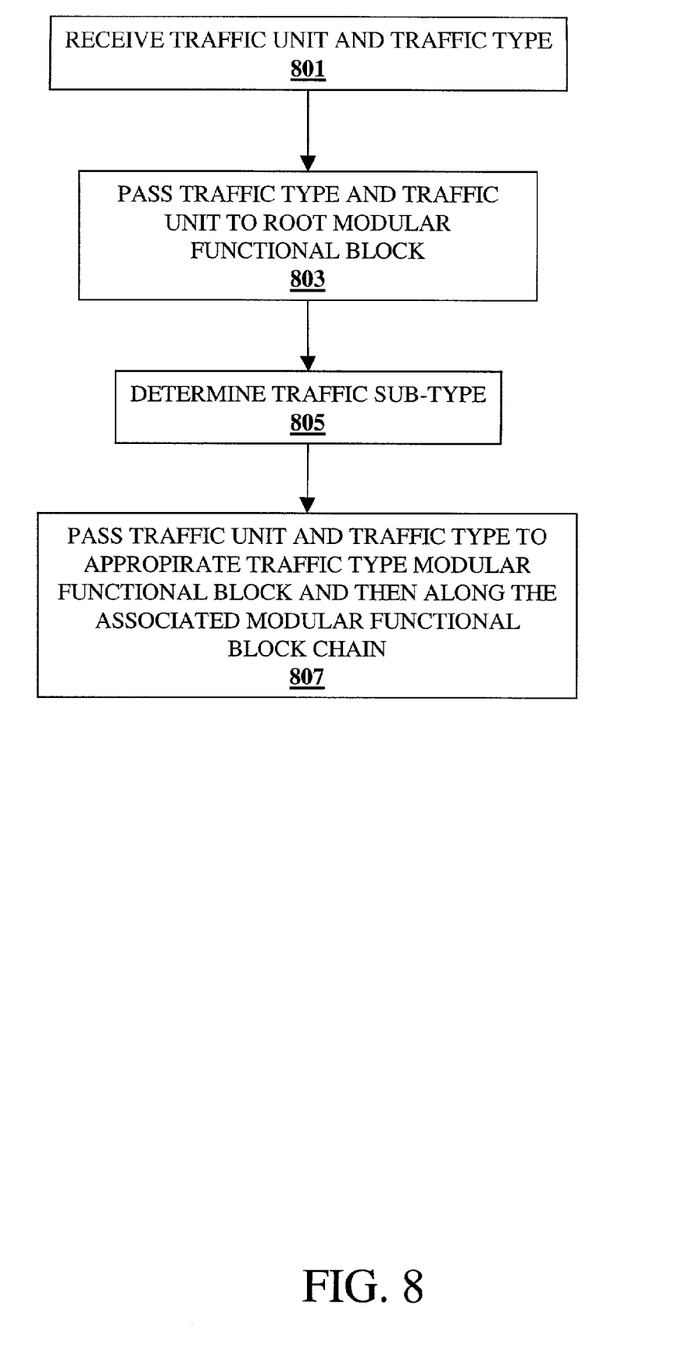
FIG. 8 is an exemplary flow diagram for processing traffic received at a virtual internal child circuit according to one embodiment of the invention.

FIG. 8 is an exemplary flow diagram for processing traffic received at a virtual internal child circuit according to one embodiment of the invention. At block 801, a circuit structure for a virtual internal child circuit receives a packet and traffic type. While in one embodiment the virtual internal child circuit receives the packet and traffic type, in an alternative embodiment of the invention the virtual internal child circuit only receives the packet and determines traffic type from inspecting the packet.

At block 803, the virtual internal child circuit passes the received packet and traffic type to the root modular functional block indicated in its virtual circuit structure. At block 805, the root modular functional block, which is a child demux modular functional block in one embodiment, determines traffic sub-type of the packet. At block 807, the packet is passed to the appropriate traffic type modular functional block that corresponds to the determined traffic type and then along the associated modular functional block chain.

Figure 9:
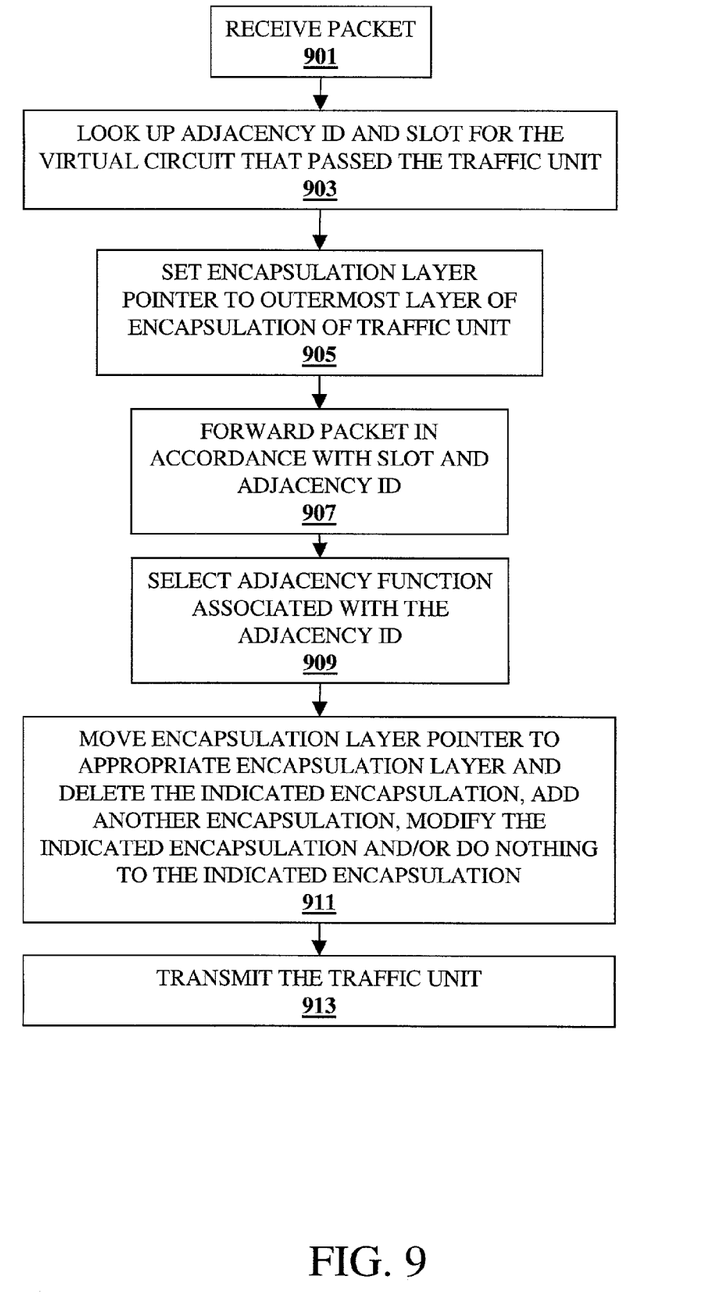
FIG. 9 is an exemplary flow chart for processing traffic at a bypass modular functional block according to one embodiment of the invention.

FIG. 9 is an exemplary flow chart for processing traffic at a bypass modular functional block according to one embodiment of the invention. At block 901, a packet is received. At block 903, the adjacency ID and slot that is associated with the virtual circuit that has passed the packet to the bypass modular functional block are looked up from a table that has been hard-coded by a user. At block 905, an encapsulation layer pointer is set to the outermost layer of encapsulation of the packet. At block 907, the packet is forwarded in accordance with the adjacency ID and slot. At block 909, an adjacency function that is associated with the selected adjacency ID is selected. At block 911, the encapsulation layer pointer is moved to the appropriate level of encapsulation and the encapsulation is deleted, new encapsulation is added, current encapsulation is nullified, and/or nothing is done to the encapsulation. To provide an example, if the packet is received via ATM and is to be transmitted to a VLAN, then the encapsulation layer will be set to the ATM header at block 905. At block 911, the encapsulation pointer will be moved to the Ethernet frame header of the packet in accordance with how the bypass has been previously defined by a user. The Ethernet frame will be modified to indicate an Ethernet type of VLAN and a VLAN identifier tag will be added to the Ethernet header. To provide another example, if the packet is received as an Ethernet frame and is to be transmitted across a network via a GRE tunnel, then the encapsulation pointer is set to the Ethernet header at block 905. At block 911, a GRE tunnel encapsulation is added to the packet. In another example, the encapsulation pointer is set to the ATM header and nothing is done to the packet because it is transparently switched out of the network element and continues on an ATM PVC.

At block 913, the packet is transmitted. In alternative embodiments of the invention, the packet may have to be queued, reordered, etc., before being transmitted.

Bypassing certain traffic enables a network element to transmit traffic without inspecting the contents of the traffic. Transmitting traffic without inspecting the contents of the traffic enables the network element to handle traffic that it does not support and enables transparent switching of traffic. An entity that owns multiple network elements may support a certain protocol only on certain of the entity's network elements. The entity can configure those network elements that do not support the certain protocol to transmit traffic of that certain protocol to those network elements that do support the certain protocol.

Figure 10:
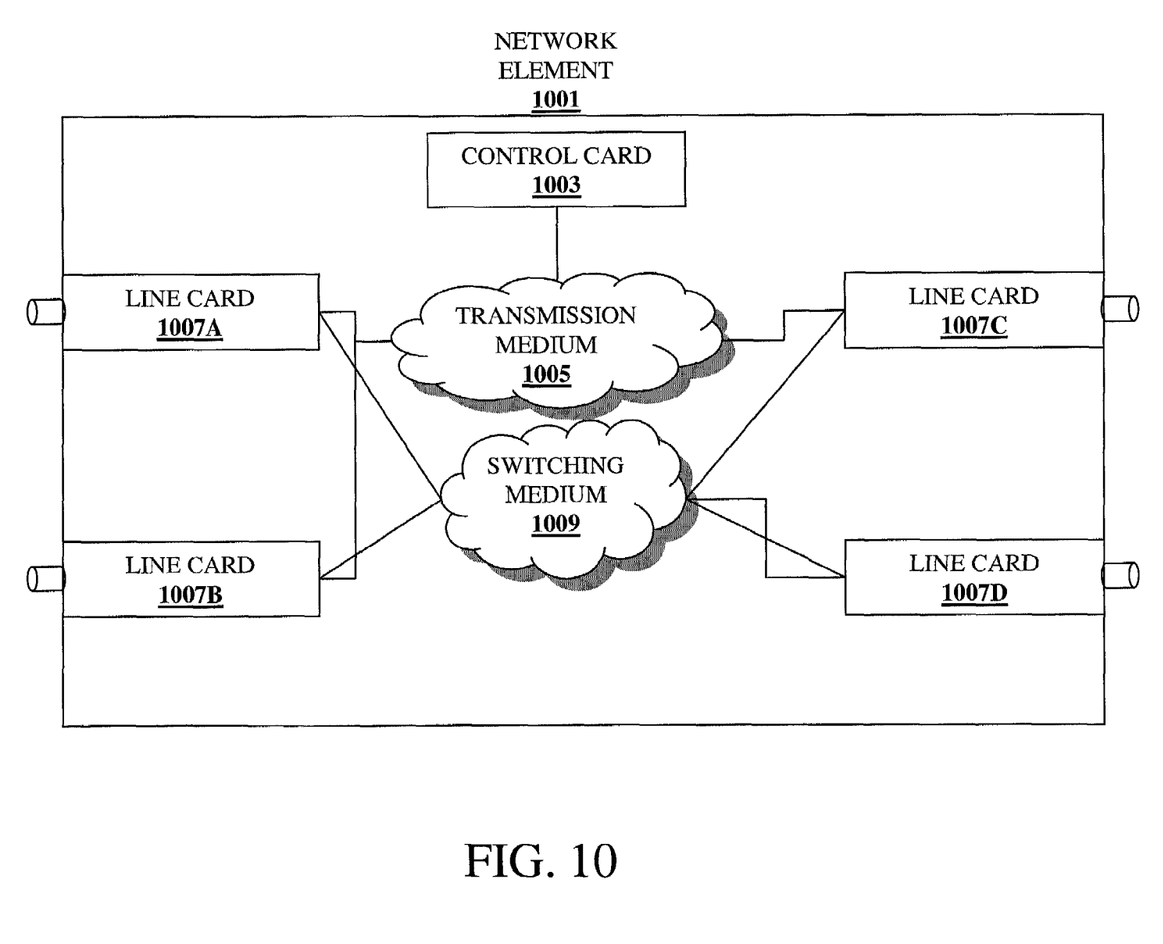
FIG. 10 is a diagram of an exemplary network element according to one embodiment of the invention.

FIG. 10 is a diagram of an exemplary network element according to one embodiment of the invention. In FIG. 10, a network element 1001 includes a control card 1003. The control card 1003 is coupled with a transmission medium 1005 (e.g., a system bus). The transmission medium 1005 is coupled with the line cards 1007A–1007D. The transmission medium 1005 carries information from the control card 1003 to the line cards 1007A–1007D. The line cards 1007A–1007D are coupled with each other via the switching medium 1009. The switching medium may be a separate switching unit including hardware and/or software to determine which line card to forward traffic to. Alternatively, the switching medium may be a mesh.

The control card 1003 and the line cards 1007A–1007D illustrated in FIG. 10 include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ACISs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A computer implemented method in a network element comprising:
   receiving a first and second packet on a first virtual connection that traverses said network element, the first packet and the second packet being of a first traffic protocol type that corresponds to the first virtual connection, the first packet's payload being a third packet of a second traffic protocol type and the second packet's payload being a fourth packet of a third traffic protocol type, wherein the second and third traffic protocol type are a Layer 2 and a Layer 3 protocol respectively;
   processing the first and the second packet with a first traffic protocol type function;
   separating the third packet and the fourth packet into a second and third virtual connection respectively based on their traffic protocol types;
   applying a first set of one or more features to the third packet;
   applying a second set of one or more features to the fourth packet; and
   transmitting the third and fourth packet to different locations, where the third packet is switched and the fourth packet is routed.

2. The computer implemented method of claim 1 wherein processing comprises decapsulating the first and second packet.

3. The computer implemented method of claim 1 wherein separating the third packet and the fourth packet comprises:
   passing the third packet to a second traffic protocol type function;
   identifying the second traffic type to the second traffic protocol type function;
   passing the fourth packet to a third traffic protocol type function; and
   identifying the third traffic type to the third traffic protocol type function.

4. The computer implemented method of claim 1 wherein applying the first set of features to the third packet comprises applying a set of one or more counters and/or a set of one or more timers to the third packet.

5. The computer implemented method of claim 1 wherein applying the second set of features to the fourth packet comprises applying a set of one or more counters and/or a set of one or more timers to the fourth packet.

6. The computer implemented method of claim 1 wherein the fourth packet is routed to a content server.

7. The computer implemented method of claim 1 further comprising:
   receiving a fifth packet on the first virtual connection;
   determining the fifth packet's payload to be of a fourth traffic protocol type that is not supported by the network element; and
   forwarding the fifth packet's payload to a bypass network element that supports the fourth traffic protocol type.

8. A computer implemented method in a network element comprising:
   receiving in the network element a first and second packet on a first virtual circuit that traverses said network element;
   determining from a virtual circuit table a virtual circuit identifier that identifies a virtual circuit structure that corresponds to said first virtual circuit, the virtual circuit structure indicating the first and second packet's traffic protocol type and indicating whether the first virtual circuit carries different protocol types of traffic;
   determining a first traffic processing function from the virtual circuit structure, wherein the first traffic processing function corresponds to a first traffic protocol type that supports the first virtual circuit;
   processing the first and second packet with the first traffic processing functional block;
   determining that the first packet's payload is of a second traffic protocol type and that the second packet's payload is of a third traffic protocol type, where the second and third traffic protocol type is a Layer 2 and Layer 3 protocol type respectively;
   passing the first and second packet's payload to a second and third virtual circuit respectively;
   processing the first packet's payload with a first series of one or more functional blocks defined for the second traffic protocol type and the second packet's payload with a second series of one or more functional blocks defined for the third traffic protocol type; and transmitting the first and second packet's payloads to different locations, where the first packet's payload is switched and the second packet's payload is routed.

9. The computer implemented method of claim 8 wherein processing comprises decapsulating.

10. The computer implemented method of claim 9 wherein processing further comprises applying a set of one or more features.

11. The computer implemented method of claim 10 wherein applying the set of features comprises applying a set of one or more counters and/or timers.

12. The computer implemented method of claim 8 wherein the second packet's payload is routed to a content server.

13. The computer implemented method of claim 8 further comprising:
  receiving a third packet on the first virtual circuit;
  determining the third packet's payload to be of a fourth traffic protocol type that is not supported by the network element; and
  forwarding the third packet's payload to a bypass network element that supports the fourth traffic protocol type.

14. An network element comprising:
  a set of one or more line cards to receive a set of one or more packets;
  a switching medium coupled to the set of line cards, the switching medium to switch the set of one or more packets between the set of line cards;
  a control card coupled to the set of line cards, the control card to download information to the set of line cards; and
  a physical machine readable medium having a set of instructions to cause the network element to individually process packets of different traffic protocol types received on a virtual connection that traverses the network element, where the different traffic protocol types are separated into different virtual connections within the network element, and where the different traffic types are processed with a different series of one or more functional blocks for each of the different virtual connections, wherein the different traffic protocol types include Layer 2 and Layer 3 protocols, and where packets corresponding to Layer 2 are switched to a destination and packets corresponding to Layer 3 are routed to a different destination.

15. The network element of claim 14 further comprising a transmission medium coupled with the control card and the set of line cards, the transmission medium to carry information from the control card to the set of line cards.

16. A network comprising:
  a first network element that is a first endpoint of a first virtual circuit;
  a second network element coupled with the first network element, the second network element being a second endpoint of said first virtual circuit; and
  a third network element coupled with the first and second network elements, the third network element having a set of instruction to cause the third network element to receive a first and second packet on said first virtual circuit that traverses said network element, the first packet and the second packet being of a first traffic protocol type that corresponds to the first virtual circuit, the first packet's payload being a third packet of a second traffic protocol type and the second packet's payload being a fourth packet of a third traffic protocol type, where the second traffic protocol type is a Layer 2 protocol and the third traffic protocol type is a Layer 3 protocol;
  process the first and the second packet with a first traffic type function;
  separate the third packet and the fourth packet into a second and third virtual connection respectively based on their traffic protocol types;
  apply a first set of one or more features to the third packet;
  applying a second set of one or more features to the fourth packet; and
  transmitting the third packet and fourth packet to different destinations, where the third packet is switched and the fourth packet is routed.

17. The network of claim 16 further comprising:
  a fourth network element coupled with the third network element, the fourth network element to process a fourth traffic protocol type that is not supported by the third network element; and
  the third network element having further instructions to cause the third network element to forward packets of the fourth traffic protocol type to the fourth network element.

18. The network element of claim 16 wherein the fourth packet is routed to a content server.

19. A physical machine-readable medium that provides instructions, which when executed by a set of one or more processors, cause said set of processors to perform operations comprising:
  receiving a first and second packet on a first virtual connection that traverses a network element, the first packet and the second packet being of a first traffic protocol type that corresponds to the first virtual connection, the first packet's payload being a third packet of a second traffic protocol type and the second packet's payload being a fourth packet of a third traffic protocol type, wherein the second and third traffic protocol type are a Layer 2 and a Layer 3 protocol respectively;
  processing the first and the second packet with a first traffic protocol type function;
  separating the third packet and the fourth packet into a second and third virtual connection respectively based on their traffic protocol types;
  applying a first set of one or more features to the third packet;
  applying a second set of one or more features to the fourth packet; and
  transmitting the third and fourth packet to different locations, where the third packet is switched and the fourth packet is routed.

20. The physical machine-readable medium of claim 19 wherein processing comprises decapsulating the first and second packet.

21. The physical machine-readable medium of claim 19 wherein separating the third packet and the fourth packet comprises:
  passing the third packet to a second traffic protocol type function;
  identifying the second traffic type to the second traffic protocol type function;
  passing the fourth packet to a third traffic protocol type function; and
  identifying the third traffic type to the third traffic protocol type function.

22. The physical machine-readable medium of claim 19 wherein applying the first set of features to the third packet comprises applying a set of one or more counters and/or a set of one or more timers to the third packet.

23. The physical machine-readable medium of claim 19 wherein applying the second set of features to the fourth packet comprises applying a set of one or more counters and/or a set of one or more timers to the fourth packet.

24. The physical machine-readable medium of claim 19 wherein the fourth packet is routed to a content server.

25. The physical machine-readable medium of claim 19 further comprising:
   receiving a fifth packet on the first virtual connection;
   determining the fifth packet's payload to be of a fourth traffic protocol type that is not supported by the network element; and
   forwarding the fifth packet's payload to a bypass network element that supports the fourth traffic protocol type.

26. A physical machine-readable medium that provides instructions, which when executed by a set of one or more processors, cause said set of processors to perform operations comprising:
   receiving in a network element a first and second packet on a first virtual circuit that traverses said network element;
   determining from a virtual circuit table a virtual circuit identifier that identifies a virtual circuit structure that corresponds to said first virtual circuit, the virtual circuit structure indicating the first and second packet's traffic protocol type and indicating whether the first virtual circuit carries different protocol types of traffic;
   determining a first traffic processing function from the virtual circuit structure, wherein the first traffic processing function corresponds to a first traffic protocol type that supports the first virtual circuit;
   processing the first and second packet with the first traffic processing functional block;
   determining that the first packet's payload is of a second traffic protocol type and that the second packet's payload is of a third traffic protocol type, where the second and third traffic protocol type is a Layer 2 and Layer 3 protocol type respectively;
   passing the first and second packet's payload to a second and third virtual circuit respectively;
   processing the first packet's payload with a first series of one or more functional blocks defined for the second traffic protocol type and the second packet's payload with a second series of one or more functional blocks defined for the third traffic protocol type; and
   transmitting the first and second packet's payloads to different locations, where the first packet's payload is switched and the second packet's payload is routed.

27. The physical machine-readable medium of claim 26 wherein processing comprises decapsulating.

28. The physical machine-readable medium of claim 27 wherein processing further comprises applying a set of one or more features.

29. The physical machine-readable medium of claim 28 wherein applying the set of features comprises applying a set of one or more counters and/or timers.

30. The physical machine-readable medium of claim 26 wherein the second packet's payload is routed to a content server.

31. The physical machine-readable medium of claim 26 further comprising:
   receiving a third packet on the first virtual circuit;
   determining the third packet's payload to be of a fourth protocol traffic that is not supported by the network element; and
   forwarding the third packet's payload to a bypass network element that supports the fourth protocol traffic type.

* * * * *